United States Patent [19]

Gobran

[11] Patent Number: 4,652,491

[45] Date of Patent: Mar. 24, 1987

[54] PRESSURE-SENSITIVE ADHESIVE AND TAPE MADE THEREWITH

[75] Inventor: Ramsis Gobran, Roseville, Minn.

[73] Assignee: Minnesota Mining and Manufacturing Company, St. Paul, Minn.

[21] Appl. No.: 729,634

[22] Filed: May 2, 1985

[51] Int. Cl.$^4$ ................................................. C09J 7/02
[52] U.S. Cl. .................................... 428/355; 428/492; 524/275; 524/271; 525/99
[58] Field of Search ....................... 428/355, 343, 492; 524/275, 271; 525/99

[56] References Cited

U.S. PATENT DOCUMENTS

| | | | |
|---|---|---|---|
| 3,239,478 | 3/1966 | Harlan | 260/27 |
| 3,464,848 | 9/1969 | Hechtman | 428/354 |
| 3,658,740 | 4/1972 | Marrs et al. | 260/27 |
| 3,787,531 | 1/1974 | Dahlquist et al. | 260/876 |
| 4,102,835 | 7/1978 | Freeman et al. | 260/5 |
| 4,104,327 | 8/1978 | Inoue et al. | 525/99 |
| 4,302,371 | 11/1981 | Matsuo et al. | 524/275 |
| 4,379,806 | 4/1983 | Korpman | 428/354 |
| 4,491,655 | 1/1985 | Sandstrom | 524/271 |

OTHER PUBLICATIONS

*Adhesions and Adhesives,* Elsevier Publishing Co., Amsterdam, Netherlands, 1967, p. 387.

*Primary Examiner*—Edith Buffalow
*Attorney, Agent, or Firm*—Donald M. Sell; James A. Smith; Richard E. Brink

[57] ABSTRACT

Pressure-sensitive adhesive capable of functioning as an adhesive for diaper closure tape, comprising a blend of specified portions of styrene:butadiene AB block copolymer, random SBR and/or milled natural rubber, and rosin ester tackifier of the type capable of tackifying butadiene-based rubbers.

7 Claims, No Drawings

PRESSURE-SENSITIVE ADHESIVE AND TAPE MADE THEREWITH

BACKGROUND OF THE INVENTION

This invention relates to normally tacky and pressure-sensitive adhesives (PSAs), especially to PSAs that adhere firmly to polyolefin surfaces. A particularly preferred embodiment of the invention is a pressure-sensitive adhesive tape capable of functioning as a closure for disposable diapers.

The term "pressure-sensitive' is commonly used to designate a distinct category of adhesive tapes and adhesives which in solvent-free form are aggressively and permanently tacky at room temperature; see Houwink and Salomon, *Adhesion and Adhesives*, Elsevier Publishing Co., Amsterdam, Netherlands, 1967, p. 387). Such adhesives are recognized to possess a "four-fold balance" of adhesion, cohesion, stretchiness, and elasticity.

The earliest PSAs used in the manufacture of PSA tapes were the so-called "rubber-resin" compositions, in which natural rubber was blended with wood rosin tackifier. Over the years during which PSAs have been in widespread use, natural rubber has frequently been replaced by synthetic rubbers, including the so-called three-block ABA block copolymers, in which A is typically styrene and B is typically isoprene or butadiene. U.S. Pat. No. 3,239,478 teaches that, when an ABA rubber is employed in rubber-resin adhesives, it is necessary to incorporate large amounts of extender oils that are substantially compatible with the B block to achieve satisfactory tack and flexibility. The addition of oils is especially important when the B block is polybutadiene, which is much harder to tackify than polyisoprene. This patent also states that when extender oils are included, a large variety of tackifying resins, including rosin esters, can be employed.

U.S. Pat. No. 3,787,531 suggests that high shear rubber-resin adhesives can be prepared from a blend of a two-block, or AB, rubber and a compatible tackifying resin. The patent indicates that minor amounts of ABA polymers can be added to the composition to increase shear and tensile strength "without severely affecting tack or quick-stick properties", but the experience of those skilled in the PSA art has taught them that in such event it is necessary to include substantial amounts of the extender oil referred to in U.S. Pat. No. 3,239,478. U.S. Pat. No. 4,102,835 describes rubber-resin adhesives in which the rubber is a blend of minor amounts of ABA polymer and major amounts of either a rubbery homopolymer or a random styrene butadiene rubber (SBR). U.S. Pat. No. 3,658,740 states that blends of SBR and linear block copolymer are incompatible and hence not usable as adhesives when tackified with rosin ester.

U.S. Pat. No. 4,379,806, while primarily devoted to pressure-sensitive adhesive tapes in which a rubber-resin adhesive layer and a backing are simultaneously extruded, suggests in somewhat sweeping terms that the rubber portion of the PSA can be based on AB rubber and/or ABA polymers, optionally including up to about 50% of highly broken down natural rubbers, butadiene-styrene random copolymer rubbers, synthetic polyisoprene, chloroprene rubbers, nitrile rubbers, butyl rubbers and the like. Eight of the nine working examples, however, describe adhesives that are based on styrene:isoprene:styrene ABA polymers, up to 75% of the total rubber optionally being styrene:isoprene AB polymer, the system being tackified with synthetic polyterpenes; the ninth example describes an ethylene:vinyl acetate copolymer rubber tackified with a rosin ester.

Special considerations are involved in developing a pressure-sensitive adhesive that will adhere well to a low energy polyolefin surface such as the polyethylene film cover or the porous nonwoven fibrous polyester or polypropylene liner of a disposable diaper. It has been discovered, for example, that natural rubber tackified with a rosin ester does not age as well as if it is tackified with poly-$\beta$-pinene or hydrocarbon resin. A blend of rosin ester with either SBR or AB polymer lacks sufficient tack to be useful.

BRIEF DESCRIPTION OF THE INVENTION

In view of the history of the rubber-resin PSA art, applicant has found that, even though natural rubber, SBR, and AB polymer tackified with rosin ester all form PSAs that either do not age well or are incapable of adhering satisfactorily to a polyethylene substrate, blends of AB rubber with either SBR or natural rubber, when tackified with rosin ester, surprisingly produce outstanding results in adhering well to polyolefin or polyester surfaces. Stated more specifically, the invention may be characterized as a normally tacky and pressure-sensitive adhesive having particular utility as an adhesive for disposable diaper closure tape, comprising in combination a blend of a. 100 parts of rubber consisting essentially of
   (1) about 85–40 parts rubbery AB styrene: butadiene block copolymer and correspondingly
   (2) about 15–60 parts rubbery polymer selected from the class consisting of
      (a) random styrene:butadiene copolymer and
      (b) milled natural rubber, and
b. 60–170 parts rosin ester tackifier of the type capable of tackifying butadiene-based rubbers.

DETAILED DESCRIPTION

In evaluating the ability of a putative rubber-resin adhesive to perform effectively as a PSA for diaper closure tape, it has been found useful to coat a solution of the adhesive on a backing and evaporate the solvent, leaving a dried adhesive weighing on the order of 20–50 g/m$^2$. The resultant tape is then tested according to a modified form of Pressure-Sensitive Tape Council Test PSTC-5*, which measures the ability of a pressure-sensitive adhesive tape to adhere to a surface instantly. The test measures the force by which the tape resists peeling at a 90° angle from a standard surface to which it has been applied. In accordance with the modification, the tape to be tested is placed in contact with a smooth-surfaced cast block of polyethylene and rolled down with a 100-gram roller at a rate of 30.5 cm per minute. The force required to remove the tape at 90° from the exposed surface of the polyethylene at a rate of 30.5 cm/minute should be on the order of at least about 200 g/inch width, or at least about 0.75 N/cm width.

*Described in detail in "Test Methods for Pressure-Sensitive Tapes," Seventh Edition, 1976, developed by the Specifications and Technical Committee of the Pressure-Sensitive Tape Council, 1201 Waukegan Rd., Glenville, IL 60025.

Essentially the same test procedure may be employed to determine whether a given substance classifies as a suitable tackifier for butadiene-based rubber. Equal parts by weight of a 25:75 styrene:butadiene SB block copolymer rubber and the substance to be evaluated as a tackifier are dissolved in a common solvent such as toluene, and coated on a suitable backing. The solvent is then evaporated and the resultant tape product tested as indicated. If the substance is to be deemed a tackifier, the force to remove the tape will be at least about 200 g/inch width, or at least about 0.75 N/cm width.

The invention will now be described with the aid of illustrative but nonlimiting examples, all parts being by weight unless otherwise specified.

In each of the examples set forth below, the rubbery components were cut into small pieces and mixed together with 2 phr (parts per hundred parts rubber) antioxidant [octadecyl-$\beta$-(3,5-tert-butyl-4-hydroxyphenyl) propionate, available under the trademark "Irganox" 1076 from Geigy Industrial Chemicals] and placed on a shaker with sufficient toluene to yield a 40–45% solids solution. This solution was then coated on one side of a 100-micrometer cast isotactic polypropylene film, the opposite side of which had been previously been provided with a silicone release coating. The solvent was evaporated in a 65° C. oven for 10 minutes to leave a dried adhesive coating weight of about 33 g/m$^2$, the resultant PSA tape then being wound convolutely upon itself about a core. 2.54-cm wide strips of this tape were then slit and tested in the manner previously described.

In the table below, the following abbreviations are used in the interest of simplicity:

Rubbery Copolymers

K 1102—28:72 styrene:butadiene linear SBS polymer, available from Shell Chemical Company under the registered trademark "Kraton" 1102.

KDX 1118—30:70 styrene:butadiene copolymer containing 20% SBS triblock and 80% SB diblock, available from Shell Chemical Company under the registered trademark "Kraton" DX 1118.

KG 1657—14:86 styrene:ethylene-butylene: styrene copolymer available from Shell Chemical Company under the registered trademark "Kraton" G 1657.

S 840 A—Stereospecific 43:57 styrene:butadiene SB rubber available from Firestone Synthetic Rubber & Latex Company under the registered trademark "Stereon" 840A.

SB 1205—25:75 styrene:butadiene SB block copolymer available under the trade designation "Solprene" 1205 from Negromex Mexico.

SBR 1006—random 23.5:76.5 styrene:butadiene SB block copolymer rubber available from Goodrich Chemical Company under the registered trade "Ameripol" 1006.

SBR 1502—Random 23.5:77.5 styrene:butadiene rubber available from Hules Mexicanos, or from Goodrich Rubber Company as "Ameripol" 1502.

Tackifier Resin

A 135—Polymerized alpha-pinene, having a softening

E 110—Aliphatic hydrocarbon available from Exxon Chemical Company under the trade designation "ECR 110".

E 1310—Synthetic polyterpene resin, available from Exxon Company under the registered trademark "Escorez" 1310 LC.

E 2500—Aliphatic/aromatic petroleum hydrocarbon resin, commercially available from Exxon Company under the registered trademark "Escorez" 2500.

F 85—Glycerol ester of highly stabilized rosin, having a softening point of about 80° C., and acid number 9, and a specific gravity of 1.07, commercially available from Hercules Incorporated under the registered N 1010—Polyterpene resin available from Reichhold Chemicals Corporation under the registered trademark "Nirez" 1010.

N 1040—Polyterpene resin available from Reichhold Chemicals Corporation under the registered trademark "Nirez" 1040.

P 120—Polyalphamethly styrene:vinyl toluene copolymer, available from Hercules Incorporated under the registered trademark "Piccotex" 120.

R 1018—Fully hydrogenated homopolymer available from Hercules Incorporated under the registered trademark "Regalrez" 1018.

RH 70—Substantially the same as F 85, commercially available from Resinas Sinteticas under the trade designation "Resigum" H-70.

W 10—Synthetic polyterpene liquid resin available from Goodyear as "Wingtack" 10.

WT 95—Polymerized mixed olefins, having a softening point of approximately 95° C., available from Goodyear Tire & Rubber Company under the registered trademark "Wing-Tack" 95.

WT 115—Polymerized mixed olefins, having a softening point of approximately 115° C., available from Goodyear Tire and Rubber Company under the registered trademark "Wing-Tack" 115.

Z 105—Styrene:limonene coploymer commercially available from Arizona Chemical Company under the trade designation "Zonatac" 105.

ZA 25—Polymerized alpha-pinene resin, available from Arizona Chemical Company under the registered trademark "Zonarez" A-25.

TABLE I

| Example | AB Rubber Type | AB Rubber Parts | Other Rubber Type | Other Rubber Parts | Tackifier Type | Tackifier Parts | Tape Removal Force N/cm width |
|---|---|---|---|---|---|---|---|
| 1 | SB 1205 | 85.6 | SBR 1502 | 14.4 | RH-70 | 122.2 | 7.78 |
| 2 | SB 1205 | 75 | SBR 1502 | 25 | RH-70 | 100 | 2.76 |
| 3 | SB 1205 | 75 | SBR 1502 | 25 | RH-70 | 160 | 2.55 |
| 4 | SB 1205 | 63.4 | SBR 1502 | 36.6 | RH-70 | 40 | 3.82* |
| 5 | SB 1205 | 63.4 | SBR 1502 | 36.6 | RH-70 | 50 | 2.28 |
| 6 | SB 1205 | 63.4 | SBR 1502 | 36.6 | RH-70 | 87.3 | 4.09 |
| 7 | SB 1205 | 63.4 | SBR 1502 | 36.6 | RH-70 | 100 | 2.52 |
| 8 | SB 1205 | 63.4 | SBR 1502 | 36.6 | RH-70 | 122.2 | 2.82 |
| 9 | SB 1205 | 63.4 | SBR 1502 | 36.6 | RH-70 | 173.2 | 2.33 |
| 10 | SB 1205 | 60 | SBR 1502 | 40 | RH-70 | 130 | 2.32 |
| 11 | SB 1205 | 60 | natural | 40** | RH-70 | 130 | 3.42 |
| 12 | KDX 1118 | 60 | SBR 1006 | 40 | RH-70 | 130 | 2.23 |

TABLE I-continued

| Example | AB Rubber Type | Parts | Other Rubber Type | Parts | Tackifier Type | Parts | Tape Removal Force N/cm width |
|---|---|---|---|---|---|---|---|
| 13 | K-1102 | 60 | SBR 1006 | 40 | RH-70 | 130 | 0.99 |
| 14 | KG 1657 | 60 | SBR 1006 | 40 | RH-70 | 130 | 0.51 |
| 15 | S 840A | 60 | SBR 1006 | 40 | RH-70 | 130 | ++ |
| 16 | SB 1205 | 60 | S 840A | 40 | RH-70 | 130 | ++ |
| 17 | SB 1205 | 50.4 | SBR 1502 | 49.6 | RH-70 | 122.2 | 3.17 |
| 18 | SB 1205 | 45 | SBR 1502 | 55 | RH-70 | 100 | 1.33 |
| 19 | SB 1205 | 45 | SBR 1502 | 55 | RH-70 | 160 | 2.17 |
| 20 | SB 1205 | 100 | — | — | RH-70 | 130 | 0.58 |
| 21 | — | — | SBR 1502+ | 100 | RH-70 | 130 | 1.19 |

*adhesive split
**40 parts natural rubber milled with an additional 10 parts TiO$_2$ to impart opacity and enhance visual appeal, especially where the tape backing is a clear film.
+required several days to dissolve completely
++too low to measure.

Examples 20 and 21, which do not represent products of the invention, illustrate the ineffectiveness of products made with either AB rubber alone or SBR rubber alone.

Example 12 shows that the AB diblock rubber can contain a minor amount (e.g. up to about 30%) of ABA triblock rubber. Thus, as used herein the term "AB styrene:butadiene block copolymer" is intended to include such polymers.

TABLE II

| Example | AB Rubber Type | Parts | Other Rubber Type | Parts | Tackifier Type | Parts | Coating Weight g/m$^2$ | Tape Removal Force, N/cm width |
|---|---|---|---|---|---|---|---|---|
| 22 | SB 1205 | 75 | SBR 1006 | 25 | RH-70 | 100 | 20.8 | 1.95 |
| 23 | SB 1205 | 75 | SBR 1006 | 25 | RH-70 | 100 | 45.9 | 3.01 |
| 24 | SB 1205 | 75 | SBR 1006 | 25 | RH-70 | 160 | 20.8 | 2.38 |
| 25 | SB 1205 | 75 | SBR 1006 | 25 | RH-70 | 160 | 45.9 | 3.32 |
| 26 | SB 1205 | 45 | SBR 1006 | 55 | RH-70 | 100 | 20.8 | 0.99 |
| 27 | SB 1205 | 45 | SBR 1006 | 55 | RH-70 | 100 | 45.9 | 1.49 |
| 28 | SB 1205 | 45 | SBR 1006 | 55 | RH-70 | 160 | 20.8 | 2.05 |
| 29 | SB 1205 | 45 | SBR 1006 | 55 | RH-70 | 160 | 45.9 | 2.50 |

The examples set forth in Table II show that adhesion in any case is affected by the ratio of the two rubbers, the tackifier:rubber ratio, and the coating weight.

TABLE III

| Example | AB Rubber Type | Parts | Other Rubber Type | Parts | First Tackifier Type | Parts | Second Tackifier Type | Parts | Tape Removal Force, N/cm width |
|---|---|---|---|---|---|---|---|---|---|
| 30 | SB 1205 | 60 | SBR 1006 | 40 | F 85 | 130 | — | — | 2.39 |
| 31 | SB 1205 | 60 | SBR 1006 | 40 | F 85 | 130 | ZA 25 | 30 | 2.46 |
| 32 | SB 1205 | 60 | SBR 1502 | 40 | F 85 | 130 | N 1010 | 30 | 2.55 |
| 33 | SB 1205 | 60 | SBR 1502 | 40 | F 85 | 130 | N 1040 | 30 | 2.72 |
| 34 | SB 1205 | 60 | SBR 1502 | 40 | F 85 | 130 | N 1010 / N 1040 | 15 / 15 | 2.63 |
| 35 | SB 1205 | 60 | SBR 1502 | 40 | F 85 | 130 | W 10 | 30 | 2.64 |
| 36 | SB 1205 | 60 | SBR 1502 | 40 | F 85 | 130 | R 1018 | 30 | 2.62 |
| 37 | SB 1205 | 60 | SBR 1006 | 40 | F 85 | 130 | — | — | 2.39 |
| 38 | SB 1205 | 60 | SBR 1502 | 40 | F 85 | 130 | P 120 | 30 | 1.19 |
| 39 | SB 1205 | 60 | SBR 1006 | 40 | Z 105 | 130 | — | — | 3.07 |
| 40 | SB 1205 | 60 | SBR 1502 | 40 | Z 105 | 130 | P 120 | 30 | 1.00 |
| 41 | SB 1205 | 60 | SBR 1006 | 40 | E 2500 | 130 | — | — | 1.65 |
| 42 | SB 1205 | 60 | SBR 1502 | 40 | E 2500 | 130 | P 120 | 30 | 1.00 |
| 43 | SB 1205 | 60 | SBR 1502 | 40 | RH-70 | 130 | — | — | 2.09 |
| 44 | SB 1205 | 60 | SBR 1502 | 40 | RH-70 | 130 | P 120 | 30 | 1.49 |
| 45 | SB 1205 | 60 | SBR 1006 | 40 | E 110 | 130 | — | — | * |
| 46 | SB 1205 | 60 | SBR 1006 | 40 | E 1310 | 130 | — | — | * |
| 47 | SB 1205 | 60 | SBR 1502 | 40 | A 135 | 130 | — | — | * |
| 48 | SB 1205 | 60 | SBR 1502 | 40 | WT 95 | 130 | — | — | * |
| 49 | SB 1205 | 60 | SBR 1502 | 40 | WT 115 | 130 | — | — | * |

*too low to measure

The examples in Table III indicate that some common tackifiers are ineffective in practicing the invention, although minor amounts can sometimes be included in an adhesive employing an effective tackifier.

I claim:

1. Normally tacky and pressure-sensitive adhesive having particular utility as an adhesive for diaper closure tape, comprising in combination a blend of:
   a. 100 parts of rubber consisting essentially of
      (1) 85–40 parts rubbery AB styrene:butadiene block copolymer and correspondingly
      (2) 15–60 parts other rubbery polymer selected from the class consisting of
         (a) random styrene:butadiene copolymer and
         (b) milled natural rubber, and
   b. 60–170 parts of tackifier capable of tackifying butadiene-based rubbers.

2. The tape of claim 1 wherein 1 there are 75–45 parts rubbery AB block copolymer correspondingly 25–45 parts other rubbery polymer, and 100–160 parts tackifier.

3. The tape of claim 2 wherein there are 70–45 parts rubbery AB and correspondingly 30–55 parts other rubbery polymer.

4. The adhesive of claim 3 further containing an effective amount of antioxidant.

5. The adhesive of claim 1 wherein the rosin ester tackifier is the highly stabilized glycerol ester of rosin.

6. The adhesive of claim 1 wherein the natural rubber is milled with an opacifying pigment.

7. Normally tacky and pressure-sensitive adhesive tape comprising a sheet backing provided with about 20–50 grams per square meter of the adhesive of claim 1, said tape having an adhesion value of at least about 0.75 N/cm width when applied to a thick film of low density polyethylene and removed therefrom.

* * * * *

UNITED STATES PATENT AND TRADEMARK OFFICE
CERTIFICATE OF CORRECTION

PATENT NO. : 4,652,491

DATED : March 24, 1987

INVENTOR(S) : Ramsis Gobran

It is certified that error appears in the above-identified patent and that said Letters Patent is hereby corrected as shown below:

Col. 4, lines 3 and 4 insert -- point of approximately 135°C., available from Hercules Incorporated as "Alpha 135". --.

Col. 4, line 20, insert -- trademark "Foral" 85. --

Signed and Sealed this

Fifteenth Day of March, 1988

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,652,491

DATED : March 24, 1987

INVENTOR(S) : Ramsis Gobran

It is certified that error appears in the above-identified patent and that said Letters Patent is hereby corrected as shown below:

In Col. 7, line 13, the word "tape" should read --adhesive--.

In Col. 8, line 1, the word "tape" should read --adhesive--.

Signed and Sealed this

Nineteenth Day of January, 1993

Attest:

DOUGLAS B. COMER

*Attesting Officer*     *Acting Commissioner of Patents and Trademarks*